US011548301B2

(12) United States Patent
Hiruma

(10) Patent No.: US 11,548,301 B2
(45) Date of Patent: Jan. 10, 2023

(54) PRINTING APPARATUS AND MOTOR

(71) Applicant: SEIKO EPSON CORPORATION, Tokyo (JP)

(72) Inventor: Daisuke Hiruma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 616 days.

(21) Appl. No.: 16/579,222

(22) Filed: Sep. 23, 2019

(65) Prior Publication Data

US 2020/0094593 A1 Mar. 26, 2020

(30) Foreign Application Priority Data

Sep. 25, 2018 (JP) ............................ JP2018-178406

(51) Int. Cl.
*H02K 37/00* (2006.01)
*B41J 25/00* (2006.01)
*B41J 19/20* (2006.01)

(52) U.S. Cl.
CPC ........... *B41J 25/006* (2013.01); *B41J 19/202* (2013.01)

(58) Field of Classification Search
None
See application file for complete search history.

(56) References Cited

U.S. PATENT DOCUMENTS

| | | | |
|---|---|---|---|
| 7,878,625 | B2 | 2/2011 | Kalmthout et al. |
| 8,042,933 | B2 | 10/2011 | Beltman et al. |
| 2011/0121667 | A1 | 5/2011 | Mori et al. |

FOREIGN PATENT DOCUMENTS

| | | | | | |
|---|---|---|---|---|---|
| CN | 101171141 | | 4/2008 | | |
| CN | 108545528 | A | * 9/2018 | ............. | B65H 18/10 |
| JP | 56-80648 | | 6/1981 | | |
| JP | 57-156652 | | 10/1982 | | |
| JP | 59-195956 | | 12/1984 | | |
| JP | 63-189572 | | 12/1988 | | |
| JP | 07266158 | A | * 10/1995 | | |
| JP | 2008272985 | A | * 11/2008 | ............. | B41J 11/04 |
| JP | 2009-201325 | | 9/2009 | | |
| JP | 2011-109885 | | 6/2011 | | |
| JP | 2012-005228 | | 1/2012 | | |
| JP | 2017-154263 | A | 9/2017 | | |
| WO | 2006-120159 | | 11/2006 | | |

* cited by examiner

*Primary Examiner* — Erica S Lin
*Assistant Examiner* — Tracey M McMillion
(74) *Attorney, Agent, or Firm* — Workman Nydegger

(57) ABSTRACT

A printing apparatus according to the present disclosure includes a biasing member that applies a force in a −Y direction, a motor supporting member including a reference surface and an inclined surface inclined so that a distance between the reference surface and the inclined surface gradually decreases in the −Y direction, and a motor including an abutting member configured to abut on the reference surface and the inclined surface. By applying the force in the −Y direction from the biasing member to the motor, the abutting member abuts on the reference surface and the inclined surface.

9 Claims, 7 Drawing Sheets

PRINTING APPARATUS AND MOTOR

The present application is based on, and claims priority from JP Application Serial Number 2018-178406, filed Sep. 25, 2018, the disclosure of which is hereby incorporated by reference herein in its entirety.

BACKGROUND

1. Technical Field

The disclosure relates to a printing apparatus and a motor suitable for the printing apparatus.

2. Related Art

For example, a printer (printing apparatus) that forms an image on a medium by alternately repeating an operation of discharging ink from a printing head while moving in a scanning direction and an operation of transporting the medium in a transport direction is known (for example, JP-A-2017-154263).

The printing apparatus described in JP-A-2017-154263 includes a printing head, a carriage that holds the printing head, a driving pulley, a driven pulley, a belt coupled to the carriage and wound around the driving pulley and the driven pulley, a biasing member, a motor coupled to the driving pulley, and a driven pulley moving mechanism. The biasing member separates the driven pulley from the driving pulley and imparts tension to the belt. The driven pulley moving mechanism moves the driven pulley against the biasing force of the biasing member to facilitate removal of the belt and replacement of the motor.

In the printing apparatus described in JP-A-2017-154263, the motor is fixed to a supporting member that supports the motor by screws, and a skilled person who is skilled in the operation of detaching and attaching the motor with respect to the supporting member has to use a dedicated tool (for example, a dedicated driver) to detach and attach the motor with respect to the supporting member. Thus, it is difficult for a user to detach and attach the motor with respect to the supporting member by himself, and extra time or extra cost may occur as compared to the case where the user detaches and attaches the motor with respect to the supporting member by himself.

SUMMARY

A printing apparatus of the present application includes a biasing member configured to apply a force in a first direction, a motor supporting member including a reference surface and an inclined surface inclined so that a distance between the reference surface and the inclined surface gradually decreases in the first direction, and a motor including an abutting member configured to abut on the reference surface and the inclined surface, wherein the force in the first direction is applied from the biasing member to the motor to press the abutting member against the reference surface and the inclined surface thereby fixing the motor to the motor supporting member.

The printing apparatus of the present application may further include a stopper abutting on the motor.

In the printing apparatus of the present application, the biasing member may be a belt that is wound around a driving roller driven by the motor and a driven roller rotating in association with the driving roller and a tension may be applied between the driving roller and the driven roller.

The printing apparatus of the present application may further include a tension adjustment mechanism configured to adjust the tension by moving the driven roller.

In the printing apparatus of the present application, the tension adjustment mechanism may include an elastic member and a simple machine configured to stretch or contract the elastic member.

In the printing apparatus of the present application, the simple machine may be a screw, and the tension adjustment mechanism may further include a handle for rotating the screw.

In the printing apparatus of the present application, the motor may be fixed to the motor supporting member in a snap-fit manner.

In the printing apparatus of the present application, the motor may include a boss positioned with respect to a hole or a groove formed in the reference surface.

A motor of the present application is a motor fixed to a motor supporting member including a reference surface and an inclined surface inclined so that a distance between the reference surface and the inclined surface gradually decreases in a first direction, and includes an abutting member configured to abut on the reference surface and the inclined surface, wherein the abutting member is pressed against the reference surface and the inclined surface in the first direction to be fixed to the motor supporting member.

DESCRIPTION OF EXEMPLARY EMBODIMENTS

Embodiments of the present disclosure are described below with reference to the accompanying drawings. The embodiments each illustrate an aspect of the present disclosure, and do not limit the disclosure in any way. The embodiments can be changed as desired without departing from the scope of the technical concept of the present disclosure. Moreover, in each of the following drawings, to make each layer, and each portion recognizable in terms of size, each layer and portion is illustrated at a scale different from an actual scale.

Exemplary Embodiment 1

Figure 1:
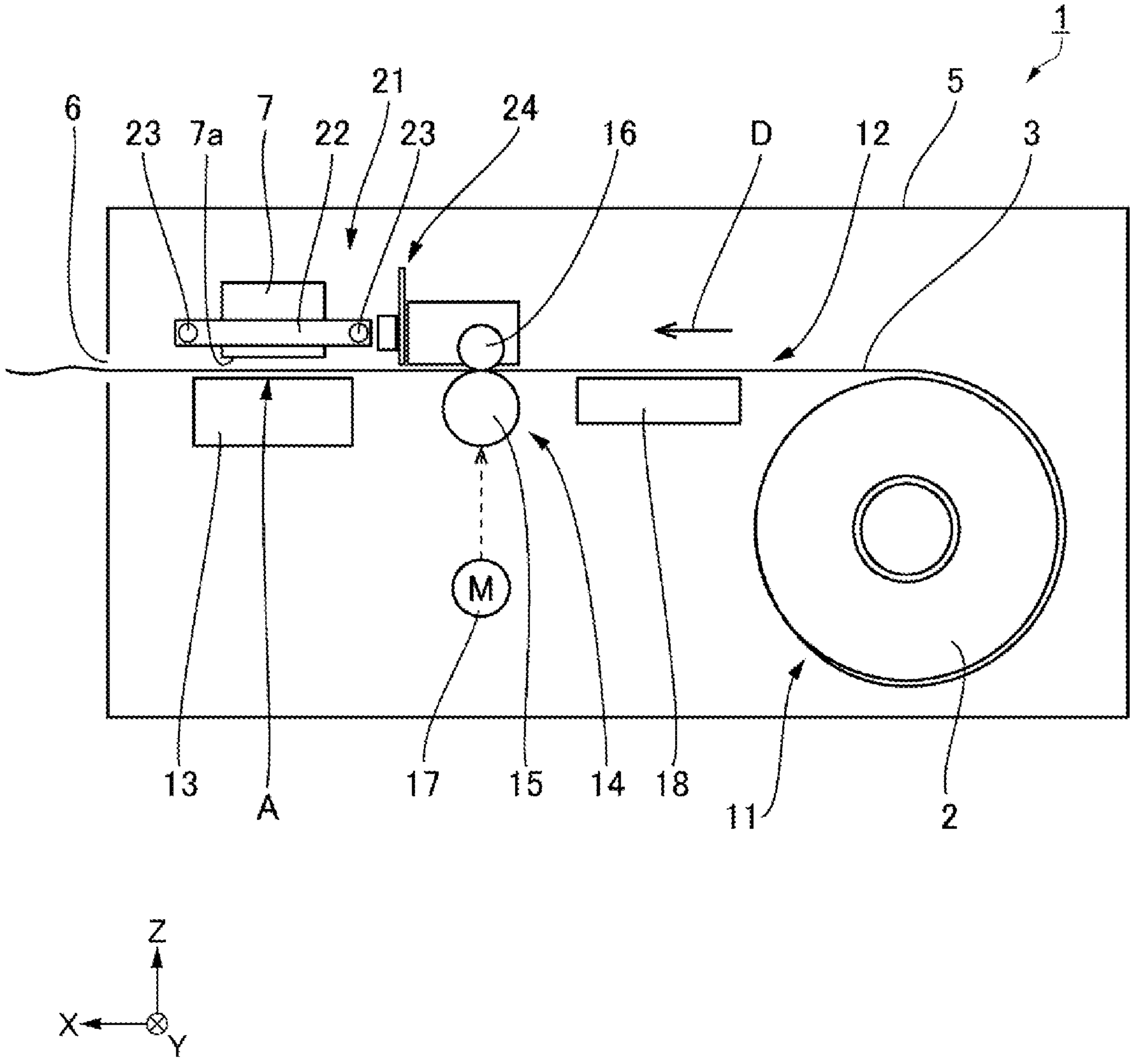
FIG. 1 is a schematic configuration diagram of a printing apparatus according to Exemplary Embodiment 1.
Figure 2:
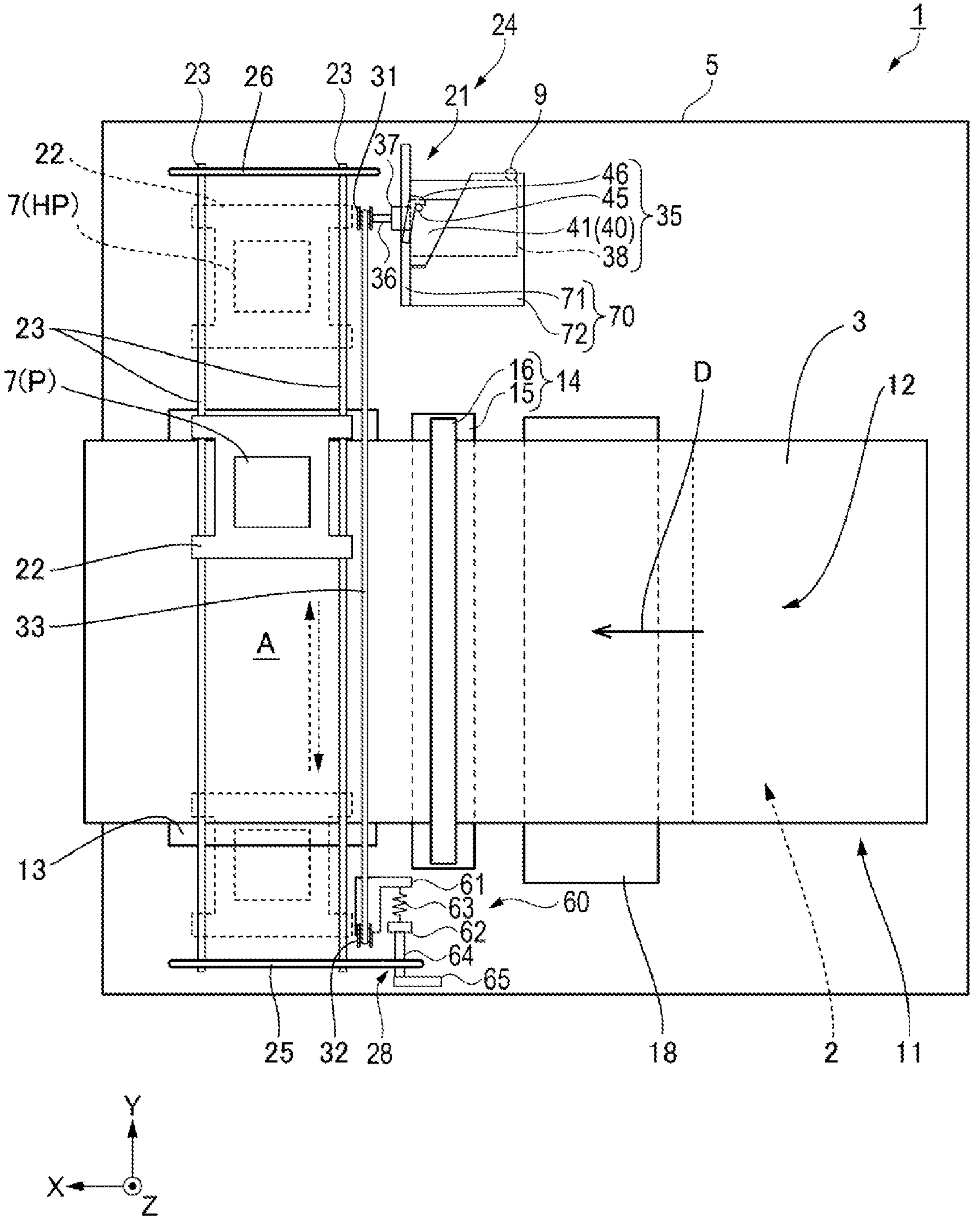
FIG. 2 is a schematic configuration diagram of a printing apparatus according to Exemplary Embodiment 1 when viewed from above.

FIG. 1 is a schematic configuration diagram of a printing apparatus 1 according to Exemplary Embodiment 1. FIG. 2 is a schematic configuration diagram of the printing apparatus 1 according to the present embodiment illustrated in FIG. 1 when viewed from above.

First of all, an overview of the printing apparatus 1 according to the present embodiment is described with reference to FIGS. 1 and 2.

As illustrated in FIG. 1, the printing apparatus 1 according to the present embodiment performs printing on a recording paper 3 having a long shape dispensed from a roll paper 2. The printing apparatus 1 includes a housing 5 having a rectangular parallelepiped shape. A paper exit 6 is disposed on a front surface of the housing 5. A printing head 7 is arranged near the paper exit 6 inside the housing 5. The printing head is an ink-jet head.

In the following description, a longitudinal direction of the rectangular parallelepiped shaped housing 5 is defined as an X direction, a lateral direction of the rectangular parallelepiped shaped housing 5 is defined as a Y direction, and a height direction of the rectangular parallelepiped shaped housing 5 is defined as a Z direction. Furthermore, the X direction is a depth direction of the printing apparatus 1, the Y direction is a width direction of the printing apparatus 1, and the Z direction is a height direction of the printing apparatus 1. Further, a leading-end side of an arrow indicating the direction is defined as a +direction, and a base-end side of the arrow indicating the direction is defined as a −direction.

Note that the −Y direction is an example of a first direction.

The printing apparatus 1 includes a roll paper storage unit 11 in which the roll paper 2 is stored in the −X direction side portion inside the housing 5. A paper transport path 12 is disposed inside the housing 5 from the roll paper storage unit 11 to the paper exit 6 via a printing position A of the printing head 7. The printing position A is defined by the platen 13 arranged at a position capable of facing the ink nozzle surface 7*a* of the printing head 7.

Further, the printing apparatus 1 includes a transport mechanism 14 that transports the recording paper 3 along the paper transport path 12 in the transport direction D. The transport mechanism 14 includes a transport roller 15 arranged upstream of the platen 13 in the transport direction D. Further, the transport mechanism 14 includes a press roller 16 that is arranged on the +Z direction side with respect to the transport roller 15 and that presses the transport roller 15. A driving force from a transport motor 17 is transmitted to the transport roller 15. A lower paper guide 18 is arranged upstream of the transport roller 15 in the transport direction D.

Furthermore, the printing apparatus 1 includes a scanning mechanism 21 that moves the printing head 7 in the width direction Y in the printing position A. The scanning mechanism 21 includes a carriage 22 on which the printing head 7 is mounted, a pair of carriage guide shafts 23 extending in the Y direction, and a carriage moving mechanism 24 that moves the carriage 22 along the carriage guide shafts 23.

As illustrated in FIG. 2, the end portion of the carriage guide shaft 23 on the −Y direction side is supported by a first sideboard frame 25, and the end portion of the carriage guide shaft 23 on the +Y direction side is supported by a second sideboard frame 26.

The carriage moving mechanism 24 includes a driving roller 31 arranged at a position near the end of the carriage guide shaft 23 on the +Y direction side, a driven roller 32 disposed at a position near the end of the carriage guide shaft 23 on the −Y direction side, a belt 33 wound around the driving roller 31 and the driven roller 32, and a carriage motor 35 that transmits a driving force to the driving roller 31. The carriage 22 on which the printing head 7 is mounted is supported by the belt 33 via a supporting member (not illustrated).

Note that, the carriage motor 35 is an example of a motor, and the belt 33 is an example of a biasing member.

The carriage motor 35 is, for example, a DC motor. The carriage motor 35 is fixed to a motor supporting member 70. The motor supporting member 70 is fixed to the housing 5. The driving roller 31 is press-fitted into an output shaft 36 of the carriage motor 35, rotates integrally with the output shaft 36 of the carriage motor 35, and is driven by the carriage motor 35. The driven roller 32 is driven to rotate in accordance with the driving roller 31. Further, a tension is applied to the belt 33, and the belt 33 is stretched around the driving roller 31 and the driven roller 32.

The biasing member in the present application is the belt 33 which is wound around the driving roller 31 driven by the carriage motor 35 and the driven roller 32 driven to rotate in association with the driving roller 31, and to which tension is applied between the driving roller 31 and the driven roller 32.

Although the details will be described later, the carriage motor 35 is fixed to the motor supporting member 70 by a force in the −Y direction applied from the belt 33. In addition, an elastic member 46 formed in the motor supporting member 70 is engaged with a rib 45 of the carriage motor 35 in an elastically deformed state, accordingly, the carriage motor 35 is fixed to the motor supporting member 70. That is, the carriage motor 35 is fixed to the motor supporting member 70 by a snap-fit manner using the elastic force of the elastic member 46.

Furthermore, the printing apparatus 1 includes a stopper 9 abutting the carriage motor 35. The stopper 9 is arranged apart from the position where a force in the −Y direction applied from the belt 33 in the carriage motor 35 acts (the position to which the driving roller 31 is fixed), and the stopper 9 can be attached and detached with respect to the housing 5. The stopper 9 suppresses the movement of the carriage motor 35 and fixes the carriage motor 35 to the motor supporting member 70.

In this way, the carriage motor 35 is fixed to the motor supporting member 70 by a stopper 9 and a snap-fit manner using the force in the −Y direction applied from the belt 33 and the elastic force of the elastic member 46.

Assuming that the carriage motor 35 is supported by a specific portion of the housing 5, and a moment to rotate the carriage motor 35 with the specific portion as a fulcrum is generated by the force in the −Y direction applied from the belt 33, the carriage motor 35 may move in an unintended direction. When the stopper 9 abutting the carriage motor 35 is disposed, even when the moment to rotate the carriage motor 35 with the specific portion as a fulcrum is generated, it is difficult for the carriage motor 35 to move in an unintended direction, and the carriage motor 35 can be fixed to a target position of the motor supporting member 70.

Note that, in order to suppress an influence of the moment to rotate the carriage motor 35, the stopper 9 may be arranged apart from the position where the force in the −Y direction applied from the belt 33 in the carriage motor 35 acts, as far as possible.

Furthermore, the printing apparatus 1 includes a tension adjustment mechanism 60 that adjusts the tension applied to the belt 33 by moving the driven roller 32.

The tension adjustment mechanism 60 includes a first supporting member 61, a second supporting member 62, a coil spring 63 serving as an elastic member, a shaft member 64 that is one example of a screw and extends in the Y direction, and a handle 65 disposed on an end of the shaft member 64 on the −Y direction side and configured to rotate the shaft member 64.

The first supporting member 61 rotatably supports the driven roller 32 and further supports one side of the coil spring 63. The first supporting member 61 is supported by the housing 5 and is movable with respect to the housing 5. Therefore, the driven roller 32 and one side of the coil spring 63 are movable with respect to the housing 5. Further, a side of the belt 33 supported by the driven roller 32 is movable with respect to the housing 5.

The second supporting member 62 is rotatably fixed to the end of the shaft member 64 on the +Y direction side. The second supporting member 62 supports the other side of the coil spring 63.

In this way, the coil spring 63 is supported by the first supporting member 61 and the second supporting member 62.

An external screw thread is formed on the outer peripheral surface of the shaft member 64. That is, the shaft member 64 is a screw in which the external screw thread is formed. That is, the shaft member 64 is a simple machine in which external screw thread is formed. The shaft member 64 is screwed into a hole 28 in which the internal screw thread of the first sideboard frame 25 is formed. When the shaft member 64 is rotated in a state in which the shaft member 64 is screwed into the hole 28 of the first sideboard frame 25, the position of the shaft member 64 can be moved and the position of the second supporting member 62 attached to the shaft member 64 can be moved.

Further, the handle 65 is attached to the end on the −Y direction side of the shaft member 64, and the shaft member 64 can be rotated by rotating the handle 65. That is, the tension adjustment mechanism 60 includes the handle 65 for rotating the shaft member 64, and the shaft member 64 is rotated by a lever using the handle 65, thus, the user can rotate the shaft 64 with a small force.

Specifically, when the handle 65 is turned counterclockwise and the shaft member 64 is turned counterclockwise, the second supporting member 62 moves in the −Y direction, the coil spring 63 expands, the first supporting member 61 supporting the coil spring 63 moves in the −Y direction, and the driven roller 32 supported by the first supporting member 61 moves in the −Y direction.

Then, the belt 33 is pulled in the −Y direction by the driven roller 32 and becomes stretched between the driven roller 32 and the driving roller 31, and a tension is applied to the belt 33. When the tension is applied to the belt 33, the driving roller 31 is pulled in the −Y direction by the belt 33, and a force in the −Y direction is applied to the driving roller 31.

In this way, when the tension is applied to the belt 33, a force in the −Y direction is applied to the driving roller 31, and a force in the −Y direction is applied to the carriage motor 35 via the driving roller 31. That is, when the tension is applied to the belt 33, the belt 33 applies a force in the −Y direction to the driving roller 31 and the carriage motor 35.

When the handle 65 is turned clockwise, the second supporting member 62 moves in the +Y direction, the coil spring 63 contracts, the first supporting member 61 supporting the coil spring 63 moves in the +Y direction, and the driven roller 32 supported by the first supporting member 61 moves in the +Y direction.

As a result, the tension applied to the belt 33 is weakened, the tension applied to the belt 33 is released, the force applied to the driving roller 31 and the carriage motor 35 in the −Y direction is released, and from a stretched state between the driven roller 32 and the driving roller 31, the belt 33 becomes slackened between the driven roller 32 and the driving roller 31. When the belt 33 is in a slack state, the belt 33 can be removed from the driving roller 31 and the driven roller 32.

In this way, tension is applied to the belt 33 and a force in the −Y direction is applied to the driving roller 31 and the carriage motor 35 by the tension adjustment mechanism 60. The strength of the tension applied to the belt 33, and the strength of the force in the −Y direction applied to the driving roller 31 and the carriage motor 35 can be adjusted by the tension adjustment mechanism 60. Furthermore, the tension applied to the belt 33, and the force in the −Y direction applied to the driving roller 31 and the carriage motor 35 can be released by the tension adjustment mechanism 60.

Specifically, the tension adjustment mechanism 60 includes the coil spring 63, which is an example of an elastic member, and the shaft member 64, which is an example of a simple machine causing the coil spring 63 to expand or contract. When the shaft member 64 displaces the coil spring 63 in an extending direction, the tension is applied to the belt 33, and a force in the −Y direction is applied to the driving roller 31 and the carriage motor 35. Furthermore, when the shaft member 64 displaces the coil spring 63 in a contracting direction, the tension applied to the belt 33 is weakened, the force in the −Y direction applied to the driving roller 31 and the carriage motor 35 is also weaken, causing the belt 33 to become slack.

Note that, the elastic member in the present application may be a spring or a rubber having elasticity. The simple machine for changing the length of the elastic member may be a screw or a lever. Furthermore, the shaft member 64 may be not disposed, and the length of the elastic member may be changed by manual labor.

In addition, the belt 33 may be configured by a member having elasticity, and the belt 33 may be stretched by a simple machine to apply tension to the belt 33, and the belt 33 may be stretched by manual labor to apply tension to the belt.

Furthermore, when the printing apparatus 1 is in a standby state for waiting for supply of printing data from an external device, as illustrated by a dashed line in the drawing, the printing head 7 is arranged in a home position HP deviated from the paper transport path 12 to the +Y direction side. When the printing data is supplied from the external device, the printing apparatus 1 drives the carriage moving mechanism 24 by a drive of the carriage motor 35 to move the carriage 22. Then, as illustrated by a solid line in the drawing, the printing head 7 is arranged in a printing reference position P. The printing reference position P is a position in which the printing head 7 overlaps the end portion on the +Y direction side of the paper transport path 12 when viewed from the Z direction side.

As illustrated by a dashed arrow in the drawing, the printing head 7 located at the printing reference position P reciprocates between the printing reference position P and the position illustrated by a dashed line in the drawing located on the −Y direction side with respect to the printing reference position P.

Then, the printing apparatus 1 drives the transport motor 17 to intermittently transports the recording paper 3 along the paper transport path 12. In addition, the printing apparatus 1 drives the carriage motor 35 in synchronization with the drive of the transport motor 17 to cause the printing head 7 to scan in the width direction of the recording paper 3 on the paper transport path 12, and drives the printing head 7 to print on the recording paper 3 passing through a printing position A.

Figure 3:
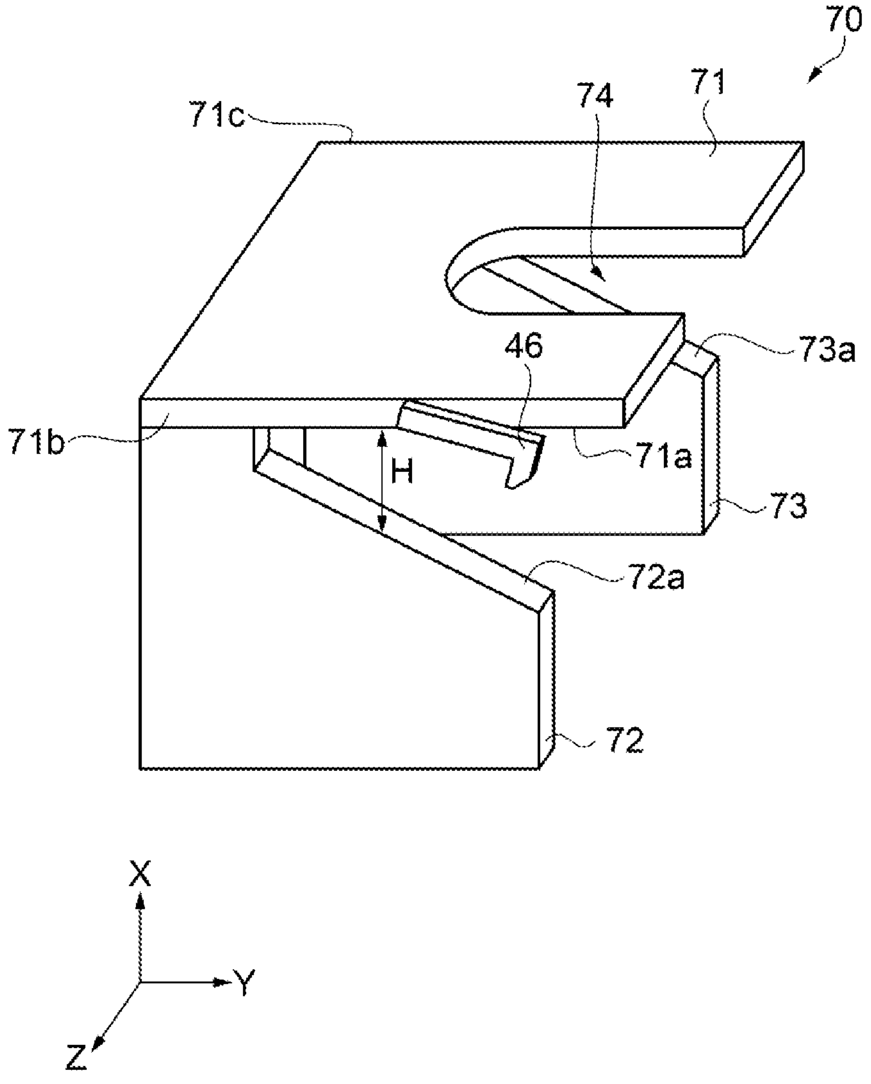
FIG. 3 is a perspective view of a motor supporting member.
Figure 4:
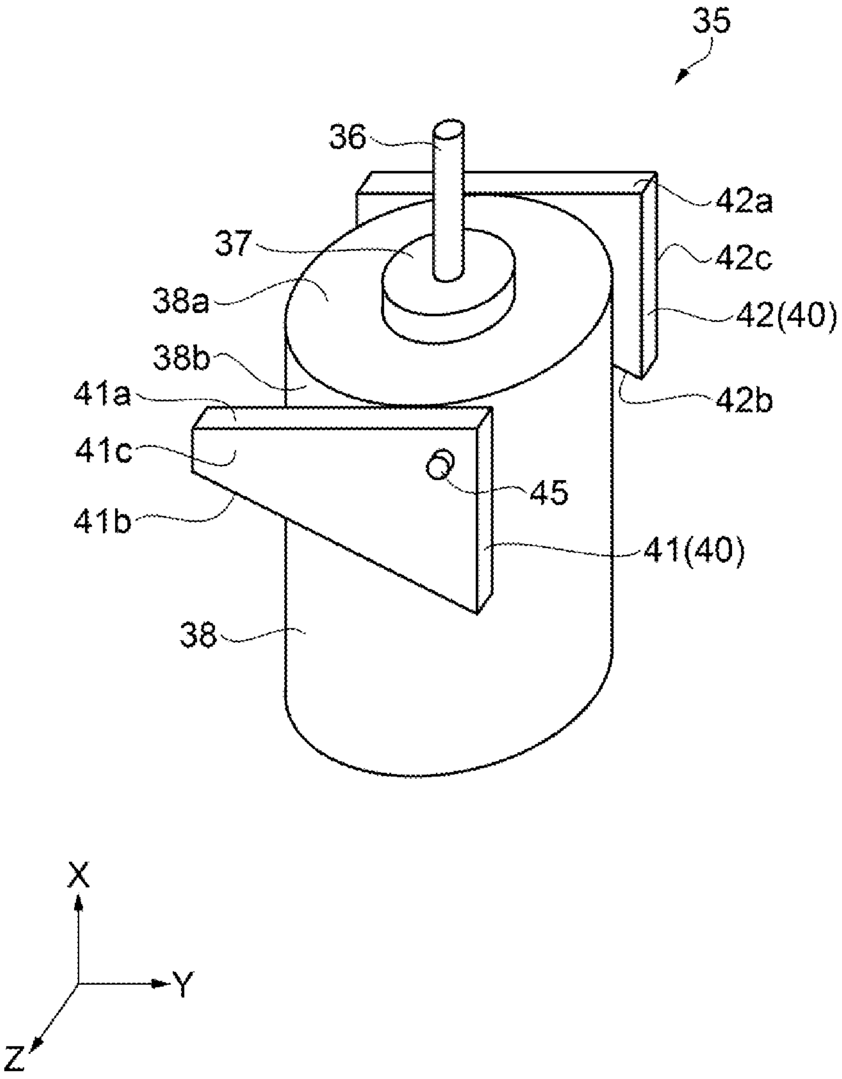
FIG. 4 is a perspective view of a carriage motor.
Figure 5:
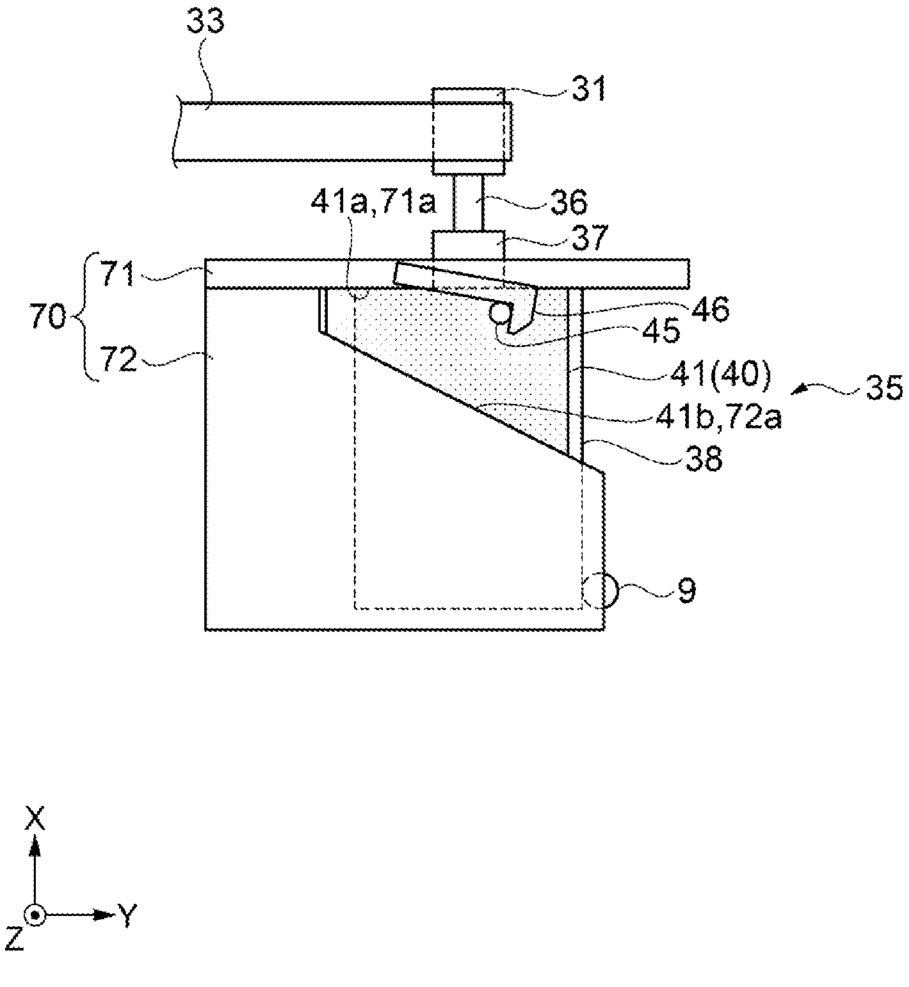
FIG. 5 is a cross-sectional view of a portion where the carriage motor is fixed to a motor supporting member.

FIG. 3 is a perspective view of the motor supporting member 70. FIG. 4 is a perspective view of the carriage motor 35. FIG. 5 is a cross-sectional view of the portion where the carriage motor 35 is fixed to the motor supporting member 70.

FIG. 5 is a cross-sectional view of the portion where the carriage motor 35 in FIG. 2 is fixed to the motor supporting member 70 cutting along the XY plane.

Next, with reference to FIGS. 3 to 5, a state in which the carriage motor 35 is fixed to the motor supporting member 70 will be described.

The motor supporting member 70 is fixed to the housing 5 of the printing apparatus 1, and is a member for fixing the carriage motor 35. As illustrated in FIG. 3, the motor supporting member 70 is constituted by three members (a first member 71, a second member 72, and a third member 73). The three members 71, 72 and 73 constituting the motor supporting member 70 are configured by electrically conductive members, and have electrical conductivity. For example, the three members 71, 72 and 73 constituting the motor supporting member 70 are configured by metal or conductive resin.

The first member 71 is a plate located on the +X direction side of the motor supporting member 70 and parallel to the YZ plane. The first member 71 includes a reference surface 71*a* located on the −X direction side, a first surface 71*b* located on the +Z direction side, and a second surface 71*c* located on the −Z direction side.

The elastic member 46 is attached to the first surface 71*b* of the first member 71. The elastic member 46 has an L-shape and is a member that is long in a direction intersecting the reference surface 71*a*, and elastically deforms. In the elastic member 46, an L-shaped bent side is displaceable, and the side opposite the L-shaped bent side are fixed to the first surface 71*b*. Furthermore, an elastic member 46 (not illustrated) is attached to the second surface 71*c*. The elastic member 46 attached to the second surface 71*c* has the same configuration as the elastic member 46 attached to the first surface 71*b*.

A groove 74 extending in the Y direction is formed on the reference surface 71*a* of the first member 71. The groove 74 is formed at a position that has the same distance from the first surface 71*b* and the second surface 71*c*.

The second member 72 is a plate parallel to the XY plane located on the +Z direction side of the motor supporting member 70. The third member 73 is a plate parallel to the XY plane located on the −Z direction side of the motor supporting member 70. When viewed from the Z direction side, the second member 72 overlaps with the third member 73 and has the same shape as the third member 73. The second member 72 and the third member 73 are fixed to the reference surface 71*a* of the first member 71.

The second member 72 has an inclined surface 72*a* inclined so that a distance H to the reference surface 71*a* gradually decreases in the −Y direction. The third member 73 has an inclined surface 73*a* inclined so that the distance H to the reference surface 71*a* gradually decreases in the −Y direction.

As described above, the motor supporting member 70 includes the reference surface 71*a* and the inclined surface 72*a* and 73*a* which are inclined so that the distances H to the reference surface 71*a* gradually decrease in the −Y direction.

As illustrated in FIG. 4, the carriage motor 35 includes an output shaft 36, a boss 37, a housing 38, and an abutting member 40. The boss 37 is fitted into the groove 74 formed in the reference surface 71*a* of the first member 71 and is positioned with respect to the groove 74.

Note that, the boss 37 may be configured to be fitted into a hole formed in the reference surface 71*a* of the first member 71 and positioned with respect to the hole. That is, the carriage motor 35 may be configured to include the boss 37 positioned with respect to the hole or the groove 74, which is formed in the reference surface 71*a*.

The housing 38 is an exterior member of the carriage motor 35 and has a cylindrical shape. The housing 38 includes a surface 38*a* arranged on the +X direction side and an outer peripheral surface 38*b* orthogonal to the surface 38*a*. A portion protruding from the surface 38*a* of the housing 38 in the +X direction is referred to as the boss 37. A shaft extending from the boss 37 in the +X direction is referred to the output shaft 36. The driving roller 31 (see FIG. 2) is attached to the end of the output shaft 36 on the +X direction side.

Two abutting members 40 (first abutting member 41 and second abutting member 42) are fixed to the outer peripheral surface 38*b* of the housing 38. In the two abutting members 40 fixed to the outer circumferential surface 38*b* of the housing 38, the first abutting member 41 is located on the +Z direction side with respect to the second abutting member 42. When viewed from the Z direction side, the first abutting member 41 overlaps the second abutting member 42 and has the same shape as the second abutting member 42. The first abutting member 41 and the second abutting member 42 have a pillar shape with a rectangular cross section cut along the XY plane.

The first abutting member 41 includes a first surface 41*a* located on the +X direction side, a second surface 41*b* located on the −X direction side, and a third surface 41*c* located on the +Z direction side. A cylindrical rib 45 is disposed on the third surface 41*c*.

The second abutting member 42 has a first surface 42*a* located on the +X direction side, a second surface 42*b* located on the −X direction side, and a third surface 42*c* located on the −Z direction side. A cylindrical rib 45 (not illustrated) is disposed on the third surface 42*c*.

In this way, the rib 45 is disposed on the abutting member 40. Furthermore, in the abutting member 40, the surface 38*a* of the housing 38, the first surface 41*a* of the first abutting member 41, and the first surface 42*a* of the second abutting member 42 are located on the same plane.

As illustrated in FIG. 5, when the carriage motor 35 is fixed to the motor supporting member 70, the first abutting member 41 in the carriage motor 35 abuts on the reference surface 71*a* of the first member 71 in the motor supporting member 70 and the inclined surface 72*a* of the second member 72. Furthermore, the first surface 41*a* of the first abutting member 41 and the reference surface 71*a* of the first member 71 are arranged along the YZ plane, and the first surface 41*a* of the first abutting member 41 is in surface contact with the reference surface 71*a* of the first member 71. The reference surface 71*a* of the first member 71 controls the position of the first abutting member 41 in the X direction, and the position of the first abutting member 41 in the X direction in the motor supporting member 70 is determined by the reference surface 71*a* of the first member 71.

The second surface 41*b* of the first abutting member 41 and the inclined surface 72*a* of the second member 72 have the same angle intersecting the YZ plane, and the second surface 41*b* of the first abutting member 41 is in surface contact with the inclined surface 72*a* of the second member 72. The reference surface 71*a* of the first member 71 and the inclined surface 72*a* of the second member 72 control the position of the first abutting member 41 in the Y direction, and the position of the first abutting member 41 in the Y direction in the motor supporting member 70 is determined by the reference surface 71*a* of the first member 71 and the inclined surface 72*a* of the second member 72.

In this way, the first abutting member 41 includes the first surface 41*a* capable of abutting the reference surface 71*a* of the motor supporting member 70, and the second surface 41*b* capable of abutting the inclined surface 72*a* of the motor supporting member 70. Then, when the first surface 41*a* of the first abutting member 41 is in surface contact with the reference surface 71*a* of the motor supporting member 70 and the second surface 41*b* of the first abutting member 41 is in surface contact with the inclined surface 72*a* of the motor supporting member 70, the position of the first abutting member 41 in the motor supporting member 70 is determined, and the first abutting member 41 is fixed to the motor supporting member 70.

Similarly, when the carriage motor 35 is fixed to the motor supporting member 70, the second abutting member 42 in the carriage motor 35 abuts on the reference surface 71*a* of the first member 71 in the motor supporting member 70 and the inclined surface 73*a* of the third member 73. Furthermore, the first surface 42*a* of the second abutting member 42 and the reference surface 71*a* of the first member 71 are arranged along the YZ plane, and the first surface 42*a* of the second abutting member 42 is in surface contact with the reference surface 71*a* of the first member 71. The reference surface 71*a* of the first member 71 controls the position of the second abutting member 42 in the X direction, and the position of the second abutting member 42 in the X direction in the motor supporting member 70 is determined by the reference surface 71*a* of the first member 71.

The second surface 42*b* of the second abutting member 42 and the inclined surface 73*a* of the third member 73 have the same angle intersecting with the YZ plane, and the second surface 42*b* of the second abutting member 42 is in surface contact with the inclined surface 73*a* of the third member 73. The reference surface 71*a* of the first member 71 and the inclined surface 73*a* of the third member 73 control the position of the second abutting member 42 in the Y direction, and the position of the second abutting member 42 in the Y direction in the motor supporting member 70 is determined by the reference surface 71*a* of the first member 71 and the inclined surface 73*a* of the third member 73.

In this way, the second abutting member 42 includes the first surface 42*a* capable of abutting the reference surface 71*a* of the motor supporting member 70, and the second surface 42*b* capable of abutting the inclined surface 73*a* of the motor supporting member 70. Then, when the first surface 42*a* of the second abutting member 42 is in surface contact with the reference surface 71*a* of the motor supporting member 70, and the second surface 42*b* of the second abutting member 42 is in surface contact with the inclined surface 73*a* of the motor supporting member 70, the position of the second abutting member 42 in the motor supporting member 70 is determined, and the second abutting member 42 is fixed to the motor supporting member 70.

The distances H between the reference surface 71*a* of the first member 71 and the inclined surfaces 72*a* and 73*a* of the members 72 and 73 in the motor supporting member 70 gradually decrease in the −Y direction and gradually increases in the +Y direction, thus, the first surfaces 41*a* and 42*a* of the abutting members 41 and 42 are in surface contact with the reference surface 71*a* of the first member 71, the second surface 41*b* and 42*b* of the abutting members 41 and 42 are in surface contact with the inclined surfaces 71*a* and 73*a* of the members 72 and 73, the abutting members 41 and 42 cannot move in the −Y direction and can move in the +Y direction.

As described above, the reference surface 71*a* of the first member 71 and the inclined surfaces 72*a* and 73*a* of the members 72 and 73 control the positions of the abutting members 41 and 42, and the positions of the abutting members 41 and 42 in the motor supporting member 70 are determined by the reference surface 71*a* of the first member 71 and the inclined surfaces 72*a* and 73*a* of the members 72 and 73.

In the present embodiment, when the first surfaces 41*a* and 42*a* of the abutting members 41 and 42 are in surface contact with the reference surface 71*a* of the first member 71, and the second surfaces 41*b* and 42*b* of the abutting members 41 and 42 are in surface contact with the inclined surfaces 72*a* and 73*a* of the members 72 and 73, the force in the −Y direction is applied to the abutting members 41 and 42, the first surfaces 41*a* and 42*a* of the abutting members 41 and 42 are pressed against the reference surface 71*a* of the first member 71, and the second surfaces 41*b* and 42*b* of the abutting members 41 and 42 are pressed against the inclined surfaces 72*a* and 73*a* of the members 72 and 73, and the abutting members 41 and 42 are fixed to the motor supporting member 70.

Specifically, the tension adjustment mechanism 60 applies a tension to the belt 33, applies a force in the −Y direction to the driving roller 31, and applies a force in the −Y direction to the carriage motor 35 via the driving roller 31. The force applied to the carriage motor 35 in the −Y direction causes the abutting members 41 and 42 of the carriage motor 35 to press against the reference surface 71*a* and the inclined surfaces 72*a* and 73*a* of the motor supporting member 70 to fix the carriage motor 35 to the motor supporting member 70.

Further, when the first surfaces 41*a* and 42*a* of the abutting members 41 and 42 pressed against the reference surface 71*a* of the first member 71, and the second surfaces 41*b* and 42*b* of the abutting members 41 and 42 pressed against the inclined surfaces 72*a* and 73*a* of the members 72 and 73, when the tension applied to the belt 33 is released and the force applied to the carriage motor 35 in the −Y direction is released by the tension adjustment mechanism 60, the abutting members 41 and 42 can be moved in the +Y direction, the abutting members 41 and 42 of the carriage motor 35 can be removed from the motor supporting member 70, and the carriage motor 35 can be removed from the motor supporting member 70.

In this way, in the present embodiment, when the tension adjustment mechanism 60 applies the tension to the belt 33, applies the force in the −Y direction to the driving roller 31, and applies the force in the −Y direction to the carriage motor 35 via the driving roller 31, the force applied to the carriage motor 35 in the −Y direction causes the abutting members 41 and 42 of the carriage motor 35 to be pressed against the reference surface 71*a* and the inclined surfaces 72*a* and 73*a* of the motor supporting member 70 to fix the carriage motor 35 to the motor supporting member 70.

In other words, in the present embodiment, by applying the force in the −Y direction to the carriage motor 35 from the belt 33 to press the abutting members 41 and 42 against the reference surface 71*a* and the inclined surfaces 72*a* and 73*a* of the motor supporting member 70, the carriage motor 35 is fixed to the motor supporting member 70.

Further, when the tension applied to the belt 33 is released and the force applied to the carriage motor 35 in the −Y direction is released by the tension adjustment mechanism 60, the abutting members 41 and 42 of the carriage motor 35 can be removed from the motor supporting member 70, and the carriage motor 35 can be removed from the motor supporting member 70.

Furthermore, when the carriage motor 35 is fixed to the motor supporting member 70, a part of the carriage motor 35 is covered by the motor supporting member 70. The motor supporting member 70 is electrically conductive, and thus the motor supporting member 70 functions as a shield that reduces the influence of electromagnetic waves on the carriage motor 35.

That is, by fixing the carriage motor 35 to the motor supporting member 70 and covering a part of the carriage motor 35 by the motor supporting member 70, the motor supporting member 70 functions as a shield that reduces the influence of electromagnetic waves on the carriage motor 35, the influence of electromagnetic waves on the carriage motor 35 is reduced, and the carriage motor 35 is less likely to malfunction.

Furthermore, in the present embodiment, when the carriage motor 35 is used for a long time, for example, when a brush of the carriage motor 35 is deteriorated, even if a user is not skilled in the operation of detaching and attaching the carriage motor 35, the deteriorated old carriage motor 35 can be removed from the motor supporting member 70, and a new carriage motor 35, which is not deteriorated, can be attached to the motor supporting member 70, which will be described in detail below.

In the operation of removing the carriage motor 35 from the motor supporting member 70, firstly, the user turns the handle 65 of the tension adjustment mechanism 60 clockwise to move the second supporting member 62 in the +Y direction, and releases the tension applied to the belt 33, the force applied to the driving roller 31 in the −Y direction and the force applied to the carriage motor 35 via the driving roller 31. Subsequently, the user removes the belt 33 wound around the driving roller 31 and the driven roller 32, and removes the stopper 9 from the housing 5.

Even when the force in the −Y direction applied to the carriage motor 35 is released, the belt 33 is removed, and the stopper 9 is removed from the housing, the carriage motor 35 is fixed to the motor supporting member 70 by snap-fit manner using the elastic force of the elastic member 46, and thus the defect that the carriage motor 35 falls from the motor supporting member 70 does not easily occur.

Subsequently, when the user pulls the carriage motor 35 in the +Y direction, the elastic member 46 elastically deforms, the engagement between the elastic member 46 and the rib 45 is released, and the fixing of the abutting members 41 and 42 to the motor supporting member 70 by the snap-fit manner is released. Then, the user can move the carriage motor 35 in the +Y direction and remove the carriage motor 35 from the motor supporting member 70.

In this way, the user can remove the carriage motor 35 from the motor supporting member 70 by a simple operation of turning the handle 65 of the tension adjustment mechanism 60 clockwise, removing the stopper 9 from the housing 5, and pulling the carriage motor 35 in the +Y direction. That is, the user can remove the carriage motor 35 from the motor supporting member 70 by an operation without the need to be skilled.

In the operation of attaching the carriage motor 35 to the motor supporting member 70, firstly, when the boss 37 of the carriage motor 35 is arranged inside the groove 74 of the motor supporting member 70, and the face 38*a* of the carriage motor 35 abutted on the reference surface 71*a* of the motor supporting member 70, the user moves the carriage motor 35 along the groove 74 in the −Y direction.

When the carriage motor 35 is moved in the −Y direction along the groove 74, the ribs 45 of the abutting members 41 and 42 move in the −Y direction and collide with the elastic member 46 of the first member 71, and the elastic member 46 of the first member 71 elastically deforms. As a result, the elastic member 46 of the first member 71, which elastically deforms, is engaged with the ribs 45, a force in the −Y direction is applied to the ribs 45 of the abutting members 41 and 42 from the elastic member 46 of the first member 71, which elastically deforms, and the abutting members 41 and 42 are fixed to the motor supporting member 70 by the snap-fit manner using the elastic force of the elastic member 46.

When the abutting members 41 and 42 are fixed to the motor supporting member 70 by the snap-fit manner using the elastic force of the elastic member 46, the first surfaces 41*a* and 42*a* of the abutting members 41 and 42 are arranged opposite the reference surface 71*a* of the first member 71, and the second surfaces 41*b* and 42*b* of the abutting members 41 and 42 are arranged opposite the inclined surfaces 72*a* and 73*a* of the members 72 and 73.

That is, the abutting members 41 and 42 can be arranged at a target position on the motor supporting member 70 where the first surfaces 41*a* and 42*a* of the abutting members 41 and 42 are in surface contact with the reference surface 71*a* of the first member 71, and the second surfaces 41*b* and 42*b* of the abutting members 41 and 42 are in surface contact with the inclined surfaces 72*a* and 73*a* of the members 72 and 73.

In this way, by the operation of abutting the surface 38*a* of the carriage motor 35 with the reference surface 71*a* of the motor supporting member 70 and moving the carriage motor 35 in the −Y direction, which does not require being skilled in, the user can fix the abutting members 41 and 42 to the motor supporting member 70 and arrange the carriage motor 35 at the target position of the motor supporting member 70.

Next, the user winds the belt 33 around the driving roller 31 and the driven roller 32 when the carriage motor 35 is arranged at the target position of the motor supporting member 70. The carriage motor 35 is fixed to the motor supporting member 70 by the snap-fit manner, thus, the user can properly wind the belt 33 around the driving roller 31 and the driven roller 32 without the carriage motor 35 falling during the operation.

Next, when the belt 33 wound around the driving roller 31 and the driven roller 32, the handle 65 of the tension adjustment mechanism 60 is turned counterclockwise, and the second supporting member 62 is moved in the −Y direction, the tension is applied to the belt 33, the force in the −Y direction is applied to the driving roller 31, and the force in the −Y direction is applied to the carriage motor 35 via the driving roller 31.

When the force in the −Y direction is applied to the carriage motor 35, the first surfaces 41*a* and 42*a* of the abutting members 41 and 42 are pressed against the reference surface 71*a* of the first member 71, the second surfaces 41*b* and 42*b* of the abutting members 41 and 42 are pressed against the inclined surfaces 72*a* and 73*a* of the members 72 and 73, and the carriage motor 35 is fixed to the motor supporting member 70. Finally, the user attaches the stopper 9 to the housing 5.

In this way, by an operation of turning the tension adjustment mechanism 60 counterclockwise and attaching the stopper 9 to the housing 5, which does not require being skilled in, the user can fix the carriage motor 35 to the motor supporting member 70 by the force in the −Y direction applied from the belt 33 and the stopper 9, in addition to the snap-fit manner using the elastic force of the elastic member 46.

As described above, by the operation that does not require being skilled in, the user can remove the carriage motor 35 from the motor supporting member 70 and attach the carriage motor 35 to the motor supporting member 70. That is, the operation of attaching and detaching the carriage motor 35 with respect to the motor supporting member 70 does not require a dedicated tool and does not require being skilled in, as compared to, for example, an operation of fixing the carriage motor 35 to the motor supporting member 70 by screws, thus, not only a skilled person who is skilled in the operation of detaching and attaching the carriage motor 35 but also a user who is not skilled in the operation of detaching and attaching the carriage motor 35 can properly carry out the operation of detaching and attaching the carriage motor 35.

When a user who is not skilled in the operation of detaching and attaching the carriage motor 35 with respect to the motor supporting member 70, as compared with the case where a skilled person who is skilled in the operation of detaching and attaching the carriage motor 35 with respect to the motor supporting member 70, extra time and extra cost are less likely to occur, and the carriage motor 35 can be efficiently attached and detached with respect to the motor support member 70 at low cost.

Exemplary Embodiment 2

Figure 6:
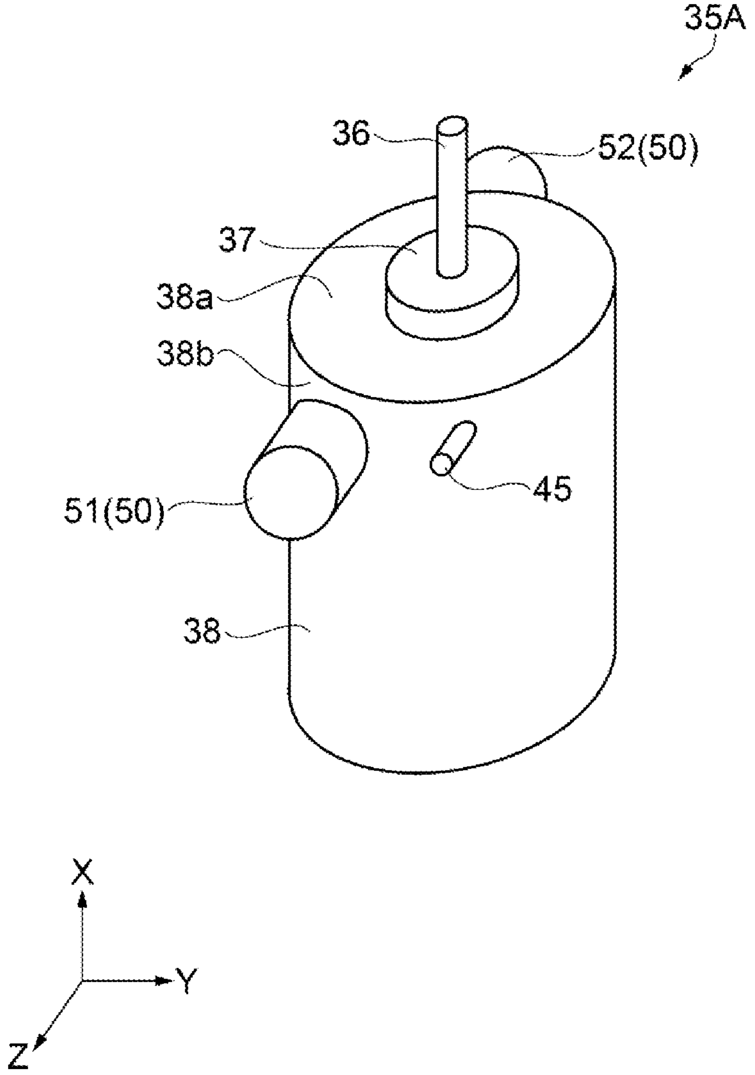
FIG. 6 is a perspective view of the carriage motor mounted on the printing apparatus according to Exemplary Embodiment 2.
Figure 7:
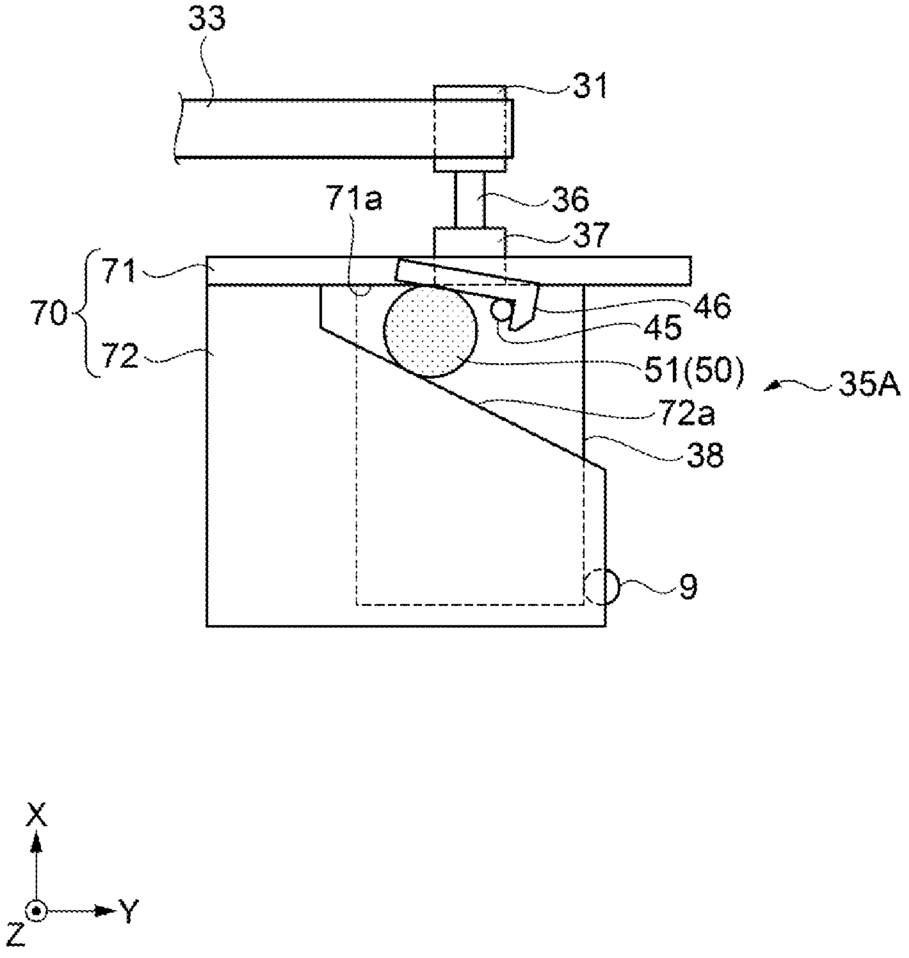
FIG. 7 is a cross-sectional view of a portion where the carriage motor is fixed to the motor supporting member.

FIG. 6 is a diagram corresponding to FIG. 4, and is a perspective view of a carriage motor mounted on a printing apparatus according to Exemplary Embodiment 2. FIG. 7 is a diagram corresponding to FIG. 5, and is a cross-sectional view of a portion where a carriage motor 35A is fixed to a motor supporting member 70.

The shape of the abutting member is different between the printing apparatus 1 according to Exemplary Embodiment 1 and the printing apparatus according to the present embodiment. This is a main difference between the printing apparatus 1 according to Exemplary Embodiment 1 and the printing apparatus according to the present embodiment.

Hereinafter, with reference to FIGS. 6 and 7, an overview of the printing apparatus according to the present embodiment will be described below focusing on the differences from Exemplary Embodiment 1. Moreover, the same constituent elements as the constituent elements in Exemplary Embodiment 1 are denoted by the same reference signs, and descriptions of such constituent elements will be omitted.

As illustrated in FIG. 6, the carriage motor 35A mounted on the printing apparatus according to Exemplary Embodiment 2 includes an output shaft 36, a boss 37, a housing 38, and an abutting member 50.

Two abutting members 50 (first abutting member 51 and second abutting member 52) and two ribs 45 are fixed to an outer peripheral surface 38*b* of the housing 38. On the other hand, in Exemplary Embodiment 1, the two ribs 45 are fixed to the third surfaces 41*c* and 42*c* of the abutting members 41 and 42. This is also a difference between the present embodiment and Exemplary Embodiment 1.

In the two abutting members 50 fixed to the outer circumferential surface 38*b* of the housing 38, the first abutting member 51 is located on the +Z direction side with respect to the second abutting member 52. When viewed from the Z direction side, the first abutting member 51 overlaps the second abutting member 52 and has the same shape as the second abutting member 52. The first abutting member 51 and the second abutting member 52 have a cylindrical shape with a circular cross section cut along the XY plane.

On the other hand, in Exemplary Embodiment 1, the first abutting member 41 and the second abutting member 42 have a pillar shape with a rectangular cross section cut along the XY plane.

As illustrated in FIG. 7, the first abutting member 51 of the carriage motor 35A is arranged in a state of abutting on the reference surface 71*a* of the first member 71 and the inclined surface 72*a* of the second member 72 in the motor supporting member 70. Furthermore, although not illustrated in the drawings, the second abutting member 52 of the carriage motor 35A is arranged in a state of abutting on the reference surface 71*a* of the first member 71 and the inclined surface 73*a* of the third member 73 in the motor supporting member 70.

When the first abutting member 51 abuts on the reference surface 71*a* of the first member 71 and the inclined surface 72*a* of the second member 72, the first abutting member 51 does not move in the −Y direction, thus, when the tension is applied to the belt 33 and the force in the −Y direction is applied to the carriage motor 35A by the tension adjustment mechanism 60, the first abutting member 51 comes into line contact with the reference surface 71*a* of the first member 71 and the inclined surface 72*a* of the second member 72, the first abutting member 51 is pressed against the reference surface 71*a* of the first member 71 and the inclined surface 72*a* of the second member 72, and the first abutting member 51 can be fixed to the motor supporting member 70. When the second abutting member 52 abuts on the reference surface 71*a* of the first member 71 and the inclined surface 73*a* of the third member 73, the second abutting member 52 does not move in the −Y direction, thus, when the tension is applied to the belt 33 and the force in the −Y direction is applied to the carriage motor 35A by the tension adjustment mechanism 60, the second abutting member 52 is pressed against the reference surface 71*a* of the first member 71 and the inclined surface 73*a* of the third member 73, and the second abutting member 52 can be fixed to the motor supporting member 70.

Then, by fixing the first abutting member 51 to the motor supporting member 70 and fixing the second abutting member 52 to the motor supporting member 70, the carriage motor 35A can be fixed to the motor supporting member 70.

The first abutting member 51 abutting on the reference surface 71*a* of the first member 71 and the inclined surface 72*a* of the second member 72 is movable in the +Y direction, thus, when the tension applied to the belt 33 is released and the force applied to the carriage motor 35A in the −Y direction is released by the tension adjustment mechanism 60, the first abutting member 51 can be moved in the +Y direction, and the first abutting member 51 can be removed from the motor supporting member 70.

The second abutting member 52 abutting the reference surface 71*a* of the first member 71 and the inclined surface 73*a* of the third member 73 is movable in the +Y direction, thus, when the tension applied to the belt 33 is released and the force applied to the carriage motor 35A in the −Y direction is released by the tension adjustment mechanism 60, the second abutting member 52 can be moved in the +Y direction, and the second abutting member 52 can be removed from the motor supporting member 70.

Then, by removing the first abutting member 51 from the motor supporting member 70 and removing the second abutting member 52 from the motor supporting member 70, the carriage motor 35A can then be removed from the motor supporting member 70.

In this way, in the present embodiment, when the tension is applied to the belt 33 and the force in the −Y direction is applied to the carriage motor 35A by the tension adjustment mechanism 60, the abutting members 51 and 52 can be pressed against the inclined surfaces 72*a* and 73*a* of the members 71 and 73, the abutting members 51 and 52 can be fixed to the motor supporting member 70, and the carriage motor 35A can be fixed to the motor supporting member 70.

Further, when the tension applied to the belt 33 is released and the force applied to the carriage motor 35A in the −Y direction is released by the tension adjustment mechanism 60, the abutting members 51 and 52 can be removed from the motor supporting member 70, and the carriage motor 35A can be removed from the motor supporting member 70.

Furthermore, as in Exemplary Embodiment 1, in the present embodiment, when the tension is applied to the belt 33 by the tension adjustment mechanism 60, the carriage motor 35A can be fixed to the motor supporting member 70, and when the tension applied to the belt 33 by the tension adjustment mechanism 60 is released, the carriage motor 35A can be removed from the motor supporting member 70. That is, as in Exemplary Embodiment 1, in the present embodiment, by an operation of applying tension to the belt 33 by the tension adjustment mechanism 60 or releasing the tension applied to the belt 33 by the tension adjustment mechanism 60, the carriage motor 35A can be attached and detached with respect to the motor support member 70, thus, not only a skilled person who is skilled in the operation of detaching and attaching the carriage motor 35A, but also a user who is not familiar with the operation of detaching and attaching the carriage motor 35A can carry out the operation of detaching and attaching the carriage motor 35A.

Then, when a user who is not skilled in detaching and attaching the carriage motor 35 with respect to the motor supporting member 70, as compared with the case where a skilled person who is skilled in detaching and attaching the carriage motor 35 with respect to the motor supporting member 70, extra time and extra cost are less likely to occur, and the carriage motor 35 can be efficiently attached and detached with respect to the motor support member 70 at low cost, which is the same effect as in Exemplary Embodiment 1.

The present disclosure is not limited to the embodiments described above, but can be changed appropriately without departing from the idea or the gist of the disclosure which can be appreciated from the claims and the entire specification, and a variety of modifications other than the above-described embodiments are conceivable. Hereinafter modified examples will be described.

Modified Example 1

In order to fix the carriage motor 35A to the motor supporting member 70 by the force in the Y-direction, it is important that the abutting members abut on the reference surface 71*a* of the first member 71 and the inclined surfaces 72*a* and 73*a* of the members 72 and 73 in the motor supporting member 70.

As long as the abutting member is configured to abut on the reference surface 71*a* of the first member 71 and the inclined surfaces 72*a* and 73*a* of the members 72 and 73 in the motor supporting member 70, the abutting member may be in surface contact, in line contact, or in point contact with the reference surface 71*a* of the first member 71 and the inclined surfaces 72*a* and 73*a* of the members 72 and 73 in the motor supporting member 70.

As long as the abutting member is configured to abut on the reference surface 71*a* of the first member 71 and the inclined surfaces 72*a* and 73*a* of the members 72 and 73 in the motor supporting member 70, the cross-sectional shape of the abutting member cut in the XY plane is not limited to a square or a circular shape described above, and may be, for example, an oval, and the cross-sectional shape of the abutting member is arbitrary.

As long as the abutting member is configured to abut on the reference surface 71*a* of the first member 71 and the inclined surfaces 72*a* and 73*a* of the members 72 and 73 in the motor supporting member 70, the reference surface 71*a* of the first member 71 and the inclined surfaces 72*a* and 73*a* of the members 72 and 73 may be flat surfaces without being curved or may be curved surfaces, and the shapes of the reference surface 71*a* of the first member 71*a* of the first member 71 and the inclined surfaces 72*a* and 73*a* of the members 72 and 73 are arbitrary.

Furthermore, in the embodiments described above, the reference surface 71*a* of the first member 71 is arranged so as to be parallel to a direction of the force applied by the belt 33 (the −Y direction). As long as the abutting member is configured to abut on the reference surface 71*a* of the first member 71 and the inclined surfaces 72*a* and 73*a* of the members 72 and 73 in the motor supporting member 70, the reference surface 71*a* of the first member 71 may be arranged so as to be parallel to the direction of the force applied by the belt 33 (−Y direction), or may be arranged to intersect the direction of the force applied by the belt 33 (−Y direction).

Modified Example 2

In the embodiments described above, the carriage motor 35, 35A is fixed to the motor supporting member 70 by the stopper 9 and the snap-fit manner using the force in the −Y direction applied from the belt 33 and the elastic force of the elastic member 46.

For example, the configuration may be such that the carriage motor 35, 35A is fixed to the motor supporting member 70 by the stopper 9 and the snap-fit manner using an elastic force of the elastic member 46. For example, the configuration may be such that the carriage motor 35, 35A is fixed to the motor supporting member 70 by the snap-fit manner using the elastic force of the elastic member 46. Furthermore, the configuration may be such that an elastic member such as an elastic rubber or a spring that applies a force in the −Y direction is newly disposed, instead of applying the force in the −Y direction to the carriage motor 35, 35A by the belt 33, the newly disposed elastic member applies the force in the −Y direction to the carriage motor 35, 35A, presses the carriage motor 35, 35A against the motor supporting member 70, and fixes the carriage motor 35, 35A to the motor supporting member 70.

Furthermore, the configuration may be such that a newly disposed balloon applies a force in the −Y direction to the carriage motor 35, 35A, presses the carriage motor 35, 35A against the motor supporting member 70, and fixes the carriage motor 35, 35A to the motor supporting member 70.

Modified Example 3

The motor of the present application is not limited to the carriage motor 35, 35A of the printing apparatus according to the embodiments described above, and may be, for example, the transport motor 17 of the printing apparatus according to the embodiments described above, or another motor other than the carriage motor 35, 35A or the transport motor 17 of the printing apparatus according to the embodiments described above.

Furthermore, the motor of the present application may be a motor mounted on another electronic device different from the printing apparatus according to the embodiments described above.

That is, as long as the motor, which is fixed to the motor supporting member 70 including the reference surface 71*a* and the inclined surfaces 72*a* and 73*a* inclined so that the distance H between the reference surface 71*a* and the reference surface 71*a* gradually decreases in the −Y direction, includes the abutting member configured to abut on the reference surface 71*a* and the inclined surfaces 72*a* and 73*a*, and has a configuration in which the abutting member is fixed to the motor supporting member 70 by pressing the abutting member against the reference surface 71*a* and the inclined surfaces 72*a* and 73*a* in the −Y direction, the present disclosure can be applied to the motor of the printing apparatus described above and can be applied to a motor of an electronic device other than the printing apparatus described above.

The contents derived from the embodiments described above will be described below.

A printing apparatus of the present application includes a biasing member configured to apply a force in a first direction, a motor supporting member including a reference surface and an inclined surface inclined so that a distance between the reference surface and the inclined surface gradually decreases in the first direction, and a motor including an abutting member configured to abut on the reference surface and the inclined surface, wherein the force in the first direction is applied from the biasing member to the motor to press the abutting member against the reference surface and the inclined surface thereby fixing the motor to the motor supporting member.

The inclined surface is inclined so that the distance between the reference surface and the inclined surface gradually decreases in the first direction, thus, when the abutting member is arranged between the reference surface and the inclined surface and the force in a first direction is applied to the abutting member, the abutting member moves in the first direction along the reference surface and the inclined surface and moves to a target position of the motor supporting member abutting on the reference surface and the inclined surface, the motor can be arranged in the target position of the motor supporting member. Further, by the force in the first direction, the abutting member is pressed against the motor supporting member, and the motor can be fixed to the target position of the motor supporting member. In addition, when the force in the first direction applied to the abutting member is released, the motor can be removed from the motor supporting member.

As compared with an operation of fixing the motor to the target position of the motor supporting member by a screw, the operation of arranging the abutting member between the reference surface and the inclined surface and applying a force in the first direction to the abutting member and the operation of releasing the force in the first direction applied to the abutting member do not require a dedicated tool or being skilled in the operation, thus, not only the skilled person who is skilled in the operation of detaching and attaching the motor, but also a user who is not skilled in the operation of detaching and attaching the motor can carry out the operation.

In this way, in the printing device of the present application, the user who is not skilled in the operation of detaching and attaching can attach and detach the motor with respect to the target position of the motor supporting member by himself, thus, as compared with the case where a skilled person who is skilled in the operation of detaching and attaching the motor with respect to the target position of the motor supporting member, extra time and extra cost are less likely to occur.

The printing apparatus of the present application may further include a stopper abutting on the motor.

Assuming that, when the motor is supported in a specified portion, by a force in the first direction, a moment to rotate the motor around the specified portion as a fulcrum is generated, the motor may move in an unintended direction, and the motor may not be fixed to the target position of the motor supporting member.

When the stopper abutting the motor is disposed, even when the moment to rotate the motor around the specific portion as a fulcrum is generated, it is difficult for the motor to move in an unintended direction, and the motor can be fixed to the target position of the motor supporting member.

In the printing apparatus of the present application, the biasing member may be a belt that is wound around a driving roller driven by the motor and a driven roller rotating in association with the driving roller, and a tension may be applied between the driving roller and the driven roller.

The belt wound around the driving roller and the driven roller is an essential component for the printing apparatus to perform the printing process. When the biasing member is configured by the essential components for the printing apparatus to perform the printing process, as compared with a case where the biasing member is configured by a new component, the number of components constituting the printing apparatus can be reduced and the cost of the printing apparatus can be lowered.

The printing apparatus of the present application may further include a tension adjustment mechanism configured to adjust the tension by moving the driven roller.

When a tension is applied to the belt wound around the driving roller and the driven roller, a force against the tension is applied from the belt to the motor via the driving roller. Then, the force against the tension is the force in the first direction applied to the motor. Then, the tension adjustment mechanism adjusts the tension, adjusts the force against the tension, and adjusts the force in the first direction.

In this way, the tension adjustment mechanism adjusts the force in the first direction, thus adjustment of the force in the first direction is facilitated.

In the printing apparatus of the present application, the tension adjustment mechanism may include an elastic member and a simple machine configured to stretch or contract the elastic member.

When the tension adjustment mechanism includes an elastic member and a simple machine that stretches or contracts the elastic member, the adjustment of the force in the first direction can be performed by stretching or contracting the elastic member.

For example, the simple machine is a screw or a lever. Adjusting the length of the elastic member using the screw or the lever, as compared with a case where the length of the elastic member is adjusted without using a screw or a lever, facilitates the adjustment of stretching or contracting the elastic member. Therefore, the adjustment of the force in the first direction performed by stretching or contracting the elastic member is facilitated.

In the printing apparatus of the present application, the simple machine may be a screw, and the tension adjustment mechanism may further include a handle for rotating the screw.

When disposing a handle for rotating the screw and using the handle to rotate the screw, as compared with rotating the screw directly without the handle, the user can rotate the screw with a small force, and the burden on the user can be reduced.

In the printing apparatus of the present application, the motor may be fixed to the motor supporting member in a snap-fit manner.

When the motor is fixed to the motor supporting member in the snap-fit manner, as compared with a case where the motor is not fixed to the motor supporting member, the belt can be easily wound around the driving roller and the driven roller, in addition, the belt can easily apply a force in the first direction to the motor via the driving roller.

In the printing apparatus of the present application, the motor may include a boss that is positioned with respect to a hole or a groove formed in the reference surface.

When the boss positioned with respect to the hole or the groove formed in the reference surface is disposed, as compared to a case that the boss is not disposed, the motor is more likely to be positioned with respect to the motor supporting member.

A motor of the present application is a motor fixed to a motor supporting member including a reference surface and an inclined surface inclined so that a distance between the reference surface and the inclined surface gradually decreases in a first direction, and includes an abutting member configured to abut on the reference surface and the inclined surface, wherein the abutting member is pressed against the reference surface and the inclined surface in the first direction to be fixed to the motor supporting member.

When the abutting member is arranged between the reference surface and the inclined surface and the force in the first direction is applied to the abutting member, the abutting member can move in the first direction along the reference surface and the inclined surface and can move to a target position of the motor supporting member abutting on the reference surface and the inclined surface, and the motor can be arranged in the target position of the motor supporting member. Further, by the force in the first direction, the abutting member is pressed against the motor supporting member, and the motor can be fixed to the target position of the motor supporting member. In addition, the motor can be removed from the motor supporting member when the force in the first direction applied to the abutting member is released.

As compared with an operation of fixing the motor to the target position of the motor supporting member by a screw, the operation of arranging the abutting member between the reference surface and the inclined surface and applying a force in the first direction to the abutting member and the operation of releasing the force in the first direction applied to the abutting member do not require a dedicated tool or being skilled in the operation, thus, is skilled in the operation of detaching and attaching the motor, but also the user who is not skilled in the operation of detaching and attaching the motor can carry out the operation.

In this way, in the motor of the present application, a user who is not skilled in the operation of detaching and attaching the motor can attach and detach the motor with respect to the target position of the motor supporting member by himself, thus, as compared with the case where a skilled person who is skilled in the operation of detaching and attaching the motor with respect to the target position of the motor supporting member, extra time and extra cost are less likely to occur.

What is claimed is:

1. A printing apparatus, comprising:

a biasing member configured to apply a force in a first direction;

a motor supporting member including a reference surface and an inclined surface inclined so that a distance between the reference surface and the inclined surface gradually decreases in the first direction; and a motor including an abutting member configured to abut on the reference surface and the inclined surface, wherein the force in the first direction is applied from the biasing member to the motor to press the abutting member against the reference surface and the inclined surface, and wherein the motor supporting member includes an elastic member that is disposed above the inclined surface, the elastic member configured to contact a portion of the motor so as to fix the motor to the motor supporting member in a snap-fit manner.

2. The printing apparatus according to claim 1, further comprising:

a stopper abutting on the motor.

3. The printing apparatus according to claim 1, wherein the biasing member is a belt that is wound around a driving roller driven by the motor and a driven roller rotating in association with the driving roller and to which a tension is applied between the driving roller and the driven roller.

4. The printing apparatus according to claim 3, further comprising:

a tension adjustment mechanism configured to adjust the tension by moving the driven roller.

5. The printing apparatus according to claim 4, wherein the tension adjustment mechanism includes an elastic member and a simple machine configured to stretch or contract the elastic member.

6. The printing apparatus according to claim 5, wherein the simple machine is a screw and the tension adjustment mechanism further includes a handle for rotating the screw.

7. The printing apparatus according to claim 1, wherein the motor includes a boss positioned with respect to a hole or a groove formed in the reference surface.

8. A motor fixed to a motor supporting member including a reference surface and an inclined surface inclined so that a distance between the reference surface and the inclined surface gradually decreases in a first direction, the motor comprising:

an abutting member configured to abut on the reference surface and the inclined surface, wherein the abutting member is pressed against the reference surface and the inclined surface in the first direction to be fixed to the motor supporting member, and wherein the motor supporting member includes an elastic member that is disposed above the inclined surface, the elastic member configured to contact a portion of the motor so as to fix the motor to the motor supporting member in a snap-fit manner.

9. A printing apparatus, comprising:

a biasing member configured to apply a force in a first direction;

a motor supporting member including a reference surface and an inclined surface inclined so that a distance between the reference surface and the inclined surface gradually decreases in the first direction; and a motor including an abutting member configured to abut on the reference surface and the inclined surface, wherein the force in the first direction is applied from the biasing member to the motor to press the abutting member against the reference surface and the inclined surface, and wherein the motor support member includes, as the inclined surface, a first inclined surface positioned on one side with respect to a surface formed by an output shaft of the motor and the first direction, and a second inclined surface positioned on the other side.

* * * * *